(12) United States Patent
Shah et al.

(10) Patent No.: US 9,253,620 B2
(45) Date of Patent: Feb. 2, 2016

(54) METHODS, APPARATUSES, AND DEVICES FOR WIRELESS TRANSCEIVER DISCOVERY USING RE-ALLOCATED SCAN TIMES

(71) Applicant: QUALCOMM Incorporated, San Diego, CA (US)

(72) Inventors: Jeemil N. Shah, San Diego, CA (US); Vishal Agarwal, San Diego, CA (US); Ashok Bhatia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/274,560

(22) Filed: May 9, 2014

(65) Prior Publication Data
US 2015/0327044 A1 Nov. 12, 2015

(51) Int. Cl.
H04W 8/00 (2009.01)
(52) U.S. Cl.
CPC ..................................... H04W 8/005 (2013.01)
(58) Field of Classification Search
USPC ......................................................... 455/434
See application file for complete search history.

(56) References Cited

U.S. PATENT DOCUMENTS

| | | | |
|---|---|---|---|
| 8,089,939 B1 | 1/2012 | Mater et al. | |
| 8,433,312 B2 | 4/2013 | Salomone et al. | |
| 8,437,313 B2 | 5/2013 | Salomone et al. | |
| 8,452,281 B2 | 5/2013 | Salomone et al. | |
| 2007/0254612 A1* | 11/2007 | Simmons et al. | 455/161.1 |
| 2007/0254649 A1* | 11/2007 | Klein et al. | 455/434 |
| 2012/0191966 A1 | 7/2012 | Jovicic et al. | |
| 2013/0150012 A1 | 6/2013 | Chhabra et al. | |
| 2014/0029596 A1 | 1/2014 | Li et al. | |
| 2014/0362420 A1* | 12/2014 | Borges et al. | 358/474 |

FOREIGN PATENT DOCUMENTS

| | | |
|---|---|---|
| EP | 1962454 | 8/2008 |
| WO | WO-2009093799 A1 | 7/2009 |
| WO | WO-2011135392 A1 | 11/2011 |
| WO | WO-2011141844 A1 | 11/2011 |

OTHER PUBLICATIONS

International Search Report and Written Opinion—PCT/US2015/029370—ISA/EPO—Jul. 28, 2015.

\* cited by examiner

*Primary Examiner* — Kabir A Timory
(74) *Attorney, Agent, or Firm* — Berkeley Law & Technology Group, LLP

(57) ABSTRACT

Methods, apparatuses, and devices are disclosed that may be used re-allocate active scan times of available frequency channels used by wireless transceivers within range of a mobile device. Re-allocation of active scan times may comprise increasing and/or decreasing active time scans based, at least in part, on a number of wireless transceivers discovered transmitting on one or more of the available frequency channels.

26 Claims, 7 Drawing Sheets

METHODS, APPARATUSES, AND DEVICES FOR WIRELESS TRANSCEIVER DISCOVERY USING RE-ALLOCATED SCAN TIMES

BACKGROUND

1. Field

The subject matter disclosed herein relates to mobile electronic devices, and, more particularly, to methods, apparatuses, and articles of manufacture that may be used by a mobile electronic device to access communication channels, which may be used to communicate, for example, with one or more wireless transceivers.

2. Information

In an indoor environment, such as within an office building, shopping mall, indoor stadium, or the like, a wireless transceiver may permit a mobile device to communicate wirelessly with a communications network. To initiate communications between a mobile device and a wireless transceiver, for example, a mobile device may transmit a probe message that may be used to solicit a response from the transceiver. Responsive to receipt of a probe message from a wireless transceiver, a mobile device may transmit parameters to the wireless transceiver, receive an electronic digital map from the wireless transceiver, obtain positioning assistance, and so forth. In many instances, it may be advantageous for the mobile device to maintain a record of the frequency channels in use by the various wireless transceivers that may be in range of the mobile device. Such record-keeping, which may comprise tracking particular frequency channels on which wireless transceivers are actively transmitting, may be useful in ensuring that a wireless transceiver is capable of maintaining communications with the communications network.

SUMMARY

Briefly, particular implementations may be directed to a method comprising, at a mobile device, allocating a total scan time uniformly among a plurality of frequency channels for one or more initial active scanning cycles and re-allocating the total scan time among the plurality of frequency channels for one or more subsequent active scanning cycles. Re-allocation may be based, at least in part, on discovered transceivers responding on individual ones of the plurality of frequency channels.

Another particular implementation may be directed to a mobile device comprising a transmitter to transmit one or more probe messages to a communications channel and a receiver to receive responses responsive to the one or more transmitted probe messages. The mobile device may further comprise one or more processors coupled to the transmitter and to the receiver to allocate a total scan time uniformly among a plurality of frequency channels to transmit the one or more probe messages and to receive responses from transceivers responding to the one or more probe messages, and to re-allocate total scan time among the plurality of frequency channels for one or more scheduled active scanning cycles based, at least in part, on the transceivers responding to the one or more probe messages.

Another particular implementation may be directed to an article comprising a storage medium comprising machine-readable instructions stored thereon which are executable by one or more processors of a mobile device to allocate a total scan time uniformly among a plurality of frequency channels for one or more initial active scanning cycles and to re-allocate the total scan time among the plurality of frequency channels for one or more subsequent active scanning cycles based, at least in part, on discovered transceivers responding on individual ones of the plurality of frequency channels.

Another particular implementation may be directed to a mobile device, comprising means for allocating a total scan time uniformly among a plurality of frequency channels for one or more initial active scanning cycles. The mobile device may further comprise means for re-allocating the total scan time among the plurality of frequency channels for one or more subsequent active scanning cycles based, at least in part, on discovered transceivers responding on individual ones of the plurality of frequency channels.

It should be understood that the aforementioned implementations are merely example implementations, and that claimed subject matter is not necessarily limited to any particular aspect of these example implementations.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
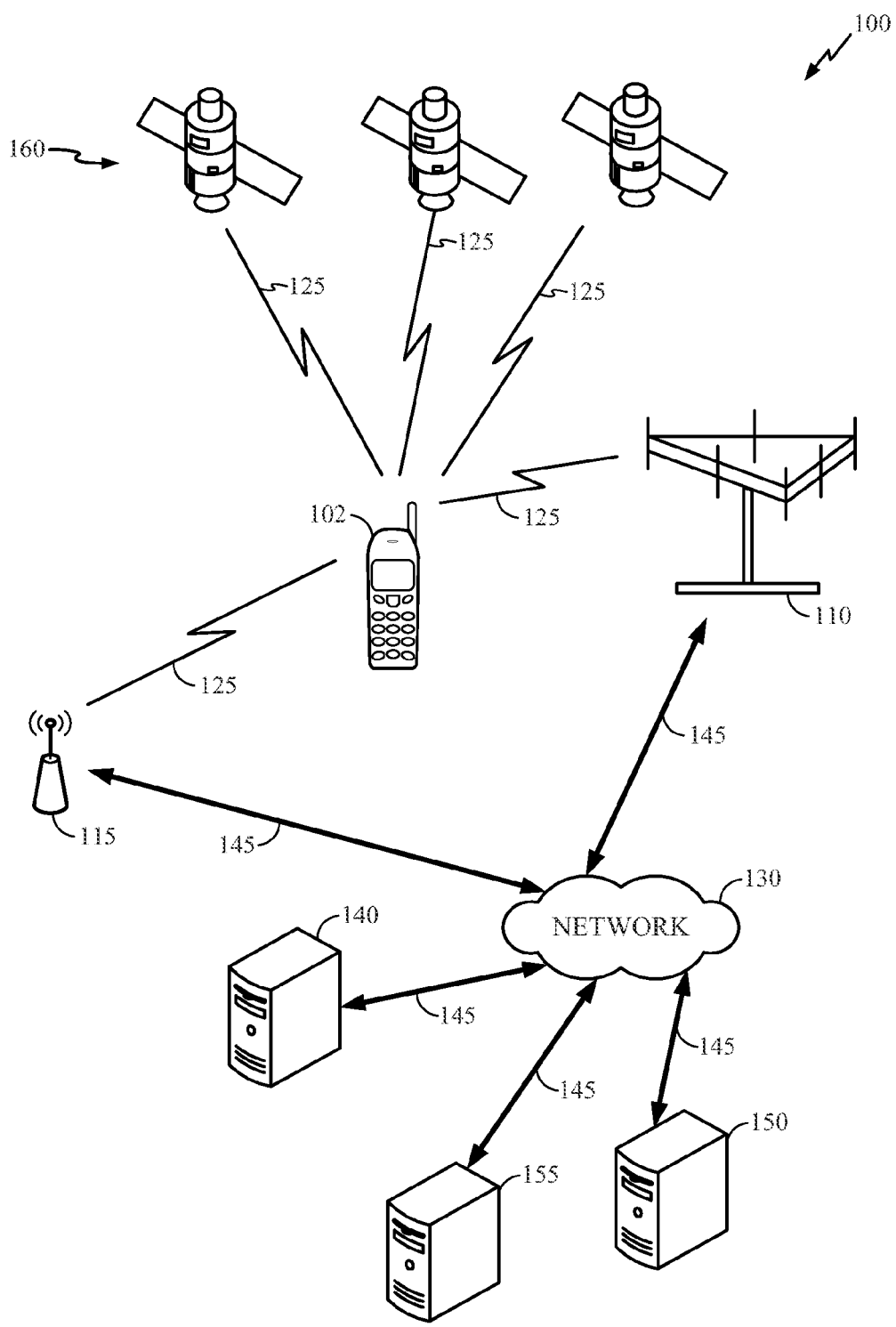
FIG. 1 is a schematic diagram of a network topology according to an embodiment.

In the following detailed description, numerous specific details are set forth to provide a thorough understanding of claimed subject matter. However, those skilled in the art will understand that claimed subject matter may be practiced without these specific details. In other instances, methods, apparatuses, and/or systems that would be known by one of ordinary skill have not been described in detail so as not to obscure claimed subject matter.

As used herein, "mobile electronic device," "mobile device," "wireless device," or the plural form of such terms, may be used interchangeably and may refer to any kind of special purpose computing platform or apparatus that may from time to time occupy a position that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be referred to simply as "mobile devices," may include, for example, cellular telephones, smart telephones, personal digital assistants, wearable computers, wrist phones, laptop computers, personal entertainment systems, tablet personal computers, personal audio or video devices, personal navigation devices, or the like. It should be appreciated, however, that these are merely examples of mobile devices that may be used, at least in part, to implement one or more operations and/or techniques for estimating a position of a mobile device, for example, and that claimed subject matter is not limited in this respect.

As used herein, a "frequency channel" may comprise a portion an electromagnetic spectrum, which may be used to convey modulated carrier signals, for example. Accordingly, in some embodiments, a frequency channel may comprise a single carrier signal and, for example, an upper sideband signal and a lower sideband signal. Carrier signals may be modulated using amplitude modulation, frequency modulation, phase modulation, and/or combinations thereof, and claimed subject matter is not limited in this respect. In certain embodiments, a frequency channel may comprise two or more subcarrier signals operating at particular ranges of frequencies offset from a center frequency. For example, in particular embodiments, a frequency channel may comprise a group of modulated subcarrier signals which may simultaneously convey parameters, for example, using sub-bands of approximately 0.0 to 15.0 kilohertz from a center frequency, approximately 0.0 to approximately −15.0 kilohertz from a center frequency, approximately +15.0 to +30.0 kilohertz from a center frequency, and so forth. In some embodiments, carrier and/or subcarrier signals of a frequency channel may be modulated using any type of symbol encoding, such as, for example, an orthogonal frequency-division multiplexing (OFDM) approach. However, claimed subject matter is not limited to particular modulation techniques.

As used herein, the term "scan time" may refer to least one duration, within which a mobile device may attempt to discover and/or acquire signals transmitted by one or more transceivers, such as a wireless access point, using a frequency channel. In particular embodiments, such as if a mobile device and a wireless transceiver communicate by way of an IEEE Std. 802.11 protocol, an "active scan time" may refer to a period of time during which a mobile device may transmit one or more probe messages, such as a "request-to-send" message frame, by way of a frequency channel. After transmitting a probe message, by way of a frequency channel, a mobile device may monitor or scan the frequency channel in an attempt to detect one or more signals from, for example, a wireless transceiver. If a mobile device and a wireless transceiver communicate by way of an IEEE Std. 802.11 protocol, monitoring or scanning of a frequency channel may enable the mobile device to receive a "clear-to-send" message frame, for example, from the wireless transceiver.

As previously discussed, a mobile device may wirelessly communicate with a wireless transceiver, such as a wireless access point, via one or more frequency channels. At times, such as if a mobile device is changing position relative to one or more wireless transceiver, the mobile device may attempt to maintain uninterrupted communications the one or more wireless transceivers. Thus, a mobile device may periodically and/or occasionally transmit one or more probe messages to wireless transceivers within range of the mobile device using available frequency channels. In one possible embodiment, a mobile device may periodically and/or occasionally transmit a request-to-send message to a wireless transceiver in accordance with an IEEE Std. 802.11 protocol. Following transmission of a request-to-send message by way of a frequency channel, a mobile device may monitor the frequency channel to detect a response from one or more wireless transceivers, for example. In particular embodiments, a wireless transceiver may respond to a request-to-send message, for example, using a clear-to-send message. Responsive to receipt of a clear-to-send message, a mobile device may initiate transmission of parameters to, and may receive parameters from, the wireless transceiver. In other embodiments, a mobile device may communicate wirelessly using protocols other than IEEE Std. 802.11. Further, embodiments may include a mobile device transmitting probe messages and receiving response messages in addition to, or in place of, request-to-send messages and clear-to-send messages, and claimed subject matter is not limited in this respect.

However, repetitive message transmissions of probe messages from a mobile device, which may occur at intervals of, for example, approximately 10.0 to 50.0 milliseconds, may incur a considerable drain on battery resources of the mobile device. Additionally, scheduling and/or initiating such repetitive probe message transmissions may involve consumption of mobile device processing resources which may, for example, interrupt other processing operations, such as position estimation, rendering of digital maps, route planning, and other functions.

In some embodiments, discovery of wireless transceivers may be achieved using re-allocated scan times, which may be employed to reduce demand for repetitive message transmission. Reductions in a demand for repetitive message transmission may bring about enhancements to mobile device battery life, more efficient use of mobile device computer processing resources, (e.g., loading of electronic digital maps by the mobile device), along with other benefits. In some embodiments, despite reductions in probe message transmissions, capabilities for rapid acquisition of signals from, for example, wireless access points may not be noticeably degraded. Discovery of wireless transceivers, such as wireless access points, using re-allocated scan time may give rise to additional benefits, and claimed subject matter is not limited in this respect.

According to certain embodiments, a method for access point discovery using re-allocated scan times may comprise a mobile device initially allocating a total active scan time, uniformly or approximately uniformly, among a number of frequency channels. Prior to and/or during an active scan time of a frequency channel, a mobile device may transmit one or more probe messages, such as a request-to-send message frame, and may monitor the frequency channel to detect one or more responses from a wireless transceiver, such as a wireless access point. Following a mobile device performing a first active scan over available frequency channels, the mobile device may return to a first frequency channel and an active scanning cycle may be repeated. In possible embodiments, active scanning cycles may be performed several times (e.g., five to fifteen times) which may permit a mobile device to discover transceivers, such as wireless access points, which may be transmitting on frequency channels.

In some embodiments, following an initial cycling through of available frequency channels, a mobile device may re-allocate active scan times among frequency channels based, at least in part, on transceivers discovered transmitting signals in response to receipt of one or more probe messages. In certain embodiments, a mobile device may incrementally increase active scan times of subsequent scans based, at least in part, on whether a level of activity detected during one or more previous active scans approaches and/or exceeds an upper threshold. Likewise, in some embodiments, a mobile device may incrementally decrease active scan times based, at least in part, on whether a level of activity detected during one or more previous active scans approaches and/or falls below a lower threshold.

In particular embodiments, following re-allocation of active scan times among frequency channels, a mobile device may perform one or more subsequent active scanning cycles using the re-allocated scan times. The mobile device may further incrementally increase active scan times of subsequent scans, based, at least in part, on a level of channel activity that continues to approach or exceed an upper threshold. Similarly, the mobile device may further decrease active scan times, based, at least in part, on a level of activity that continues to approach or fall below a lower threshold, for example. It should be noted that a mobile device may increase and/or decrease active scan times for subsequent scans according to other criteria, and claimed subject matter is not limited in this respect.

In some embodiments, in addition to, or in place of, re-allocating active scan times among frequency channels, a mobile device may increase or decrease frequency and/or number of probe messages transmitted during a subsequent active scan time. For example, if a mobile device increases active scan time for an available frequency channel, the mobile device may decrease frequency of probe message transmission during the increased active scan time for subsequent scan. Such adjustment in frequency or number of transmissions of probe messages may permit a mobile device to increase active scan time for relatively active frequency channels while permitting the mobile device to limit a number of probe messages transmitted during the active scan time. As a consequence, embodiments may enable a mobile device, for example, to conserve battery and processing resources as well as bring about other benefits, and claimed subject matter is not limited in this respect.

FIG. 1 is a schematic diagram of a network topology 100 according to an embodiment. As described below, one or more processes or operations for access point discovery using re-allocated scan time may be implemented in a signal environment that may be utilized by mobile device 102, for example. It should be appreciated that network topology 100 is described herein as a non-limiting example that may be implemented, in whole or in part, in the context of various communications networks or combination of networks, such as public networks (e.g., the Internet, the World Wide Web), private networks (e.g., intranets), wireless local area networks (WLAN, etc.), or the like. It should also be noted that claimed subject matter is not limited to any particular type of outdoor or indoor implementation. For example, at times, one or more operations or techniques described herein may be performed, at least in part, in an environment that may comprise indoor environments, dense urban environments, partially indoor/outdoor environments, such as amphitheaters, partially enclosed sports stadiums, and so forth, and claimed subject matter is not limited in this respect.

As illustrated, network topology 100 may comprise, for example, one or more space vehicles 160, cellular base station 110, wireless transmitter 115, etc. capable of communicating with mobile device 102 via wireless communication links 125 in accordance with one or more protocols. Space vehicles 160 may be associated with one or more satellite positioning systems (SPS), such as, for example, the United States Global Positioning System (GPS), the Russian GLONASS system, the European Galileo system, as well as any system that may utilize space vehicles from a combination of SPSs, or any SPS developed in the future. Space vehicles 160 may also represent one or more orbiting space vehicles of a regional satellite navigation system such as, for example, Quasi-Zenith Satellite System (QZSS) over Japan, Indian Regional Navigational Satellite System (IRNSS) over India, Beidou/Compass over China, etc., and/or various augmentation systems (e.g., an Satellite Based Augmentation System (SBAS)) that may be associated with or otherwise enabled for use with one or more global and/or regional navigation satellite systems. It should be noted that claimed subject matter is not limited to the use of space vehicles such as those space vehicles of the aforementioned global or regional satellite navigation systems. Cellular base station 110, wireless transmitter 115, etc. may be of the same or similar type, for example, or may represent different types of devices, such as access points, radio beacons, cellular base stations, femtocells, or the like, depending on an implementation. At times, one or more wireless transmitters, such as wireless transmitters 115, for example, may be capable of transmitting as well as receiving wireless signals.

In some instances, one or more cellular base stations 110, wireless transmitters 115, etc. may, for example, be operatively coupled to a network 130 comprising one or more wired or wireless communications or computing networks capable of transmitting messages including items, such as an electronic digital map, that may be relevant to a mobile device user's estimated location via one or more wireless communication links 125, 145, and so forth. A position of mobile device 102 may be estimated by relating received signal strength with expected and/or predicted values from a radio heatmap.

Even though a certain number of computing platforms or devices are illustrated herein, any number of suitable computing platforms or devices may be implemented to facilitate or otherwise support one or more techniques or processes associated with network topology 100. For example, at times, network 130 may be coupled to one or more wired or wireless communications networks (e.g., Wi-Fi, etc.) so as to enhance a coverage area for communications with mobile device 102, one or more base transceiver stations 110, wireless transmitters 115, servers 140, 150, 155, or the like. In some instances, network 130 may facilitate or support femtocell-based operative regions of coverage, for example. Again, these are merely example implementations, and claimed subject matter is not limited in this regard.

Figure 2:
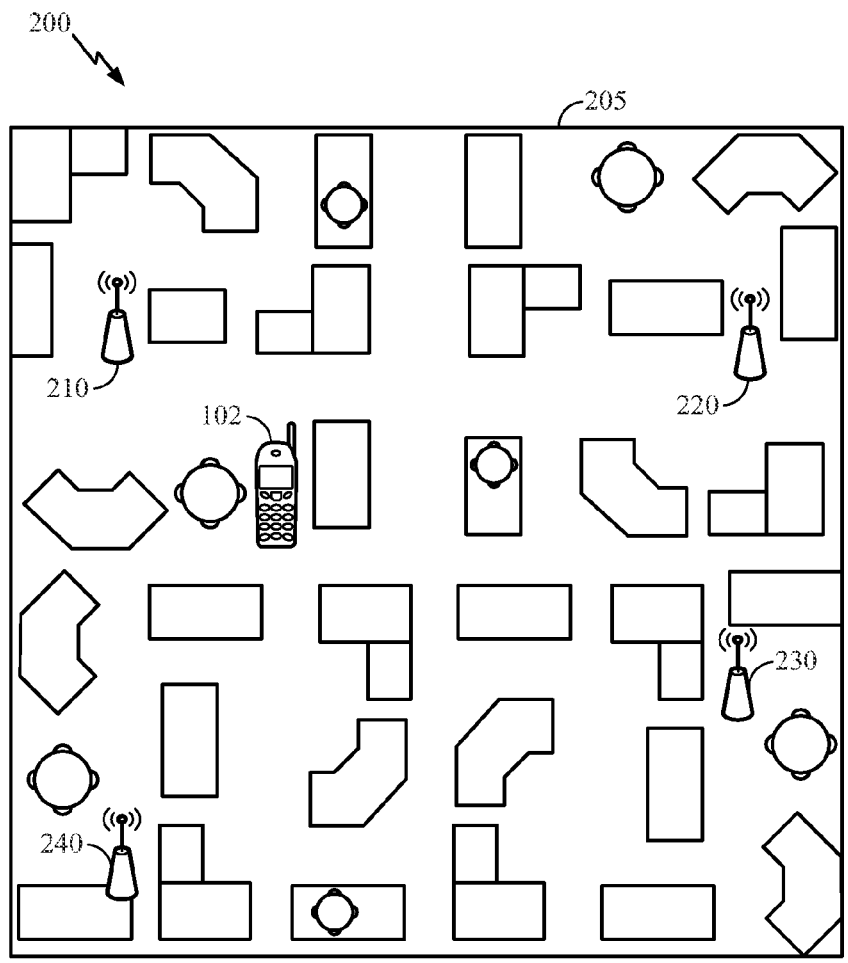
FIG. 2 is a schematic diagram of an indoor area showing a mobile device located within range of several wireless transceivers according to an embodiment.

FIG. 2 is a schematic diagram 200 of an indoor area showing a mobile device located within range of several wireless transceivers according to an embodiment. Diagram 200 shows wireless access points 210, 220, 230, and 240 positioned at various locations throughout indoor area 205, which may employ one or more frequency channels to transmit signals to, and to receive signals from, mobile device 102. Although four wireless access points are illustrated in FIG. 2, any number of wireless access points or other types of wireless transceivers may be in at least occasional communication with mobile device 102, and claimed subject matter is not limited to mobile devices communicating with any particular number of wireless transceivers. In some embodiments, a wireless communications network, which may comprise wireless access points 210, 220, 230, and 240, may permit mobile device 102 to interact with a communications infrastructure, to receive electronic digital maps, send and receive e-mails, perform text-messaging functions, and so forth.

In some embodiments, mobile device 102 may acquire one or more beacon signals transmitted from wireless access points 210, 220, 230, and/or 240. To bring about acquisition of beacon signals, mobile device 102 may occasionally actively scan frequency channels used by one or more access points. Responsive to active scanning of frequency channels, mobile device 102 may maintain a record of frequency channels for which an activity level approaches or exceeds an upper threshold. Mobile device 102 may additionally maintain a record of frequency channels for which an activity level approaches or falls below a lower threshold. Responsive to creating and maintaining records of frequency channel activity, mobile device 102 may be configured to immediately access several active frequency channels to permit uninterrupted communications with a communications network. Creating and maintaining records of frequency channel activity may enable additional benefits to a user of mobile device 102, and claimed subject matter is not limited in this respect.

Figure 3:
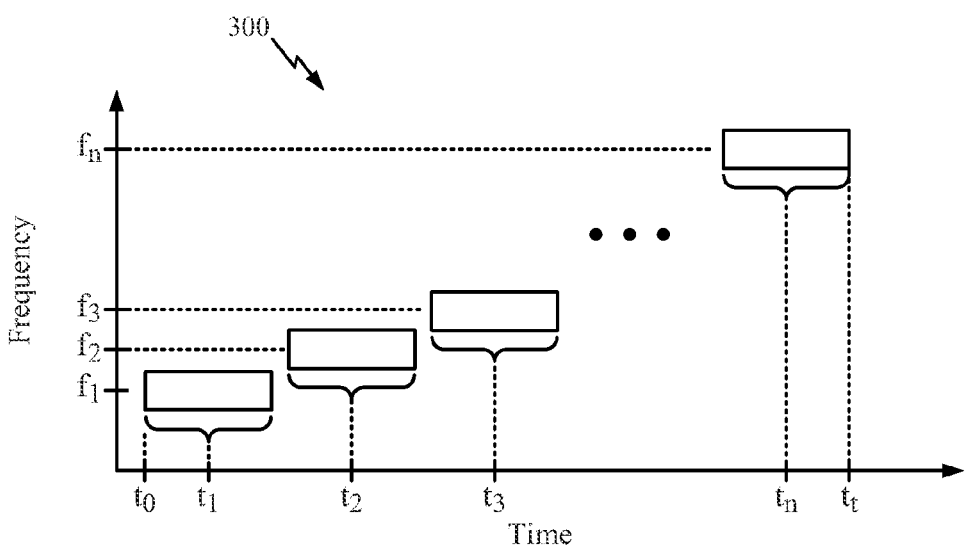
FIG. 3 is a graph showing approximately uniform active scan times versus frequency bands used in a method for access point discovery according to an embodiment.

FIG. 3 is a graph 300 showing approximately uniform active scan times versus frequency bands used in a method for access point discovery according to an embodiment. In FIG. 3, a mobile device, such as mobile device 102 of FIGS. 1 and 2 may perform one or more initial active scanning cycles over a total time period extending from $t_0$ to $t_f$. As illustrated in FIG. 3, during the total time period extending from $t_0$ to $t_f$, frequency channels $f_1, f_2, f_3, \ldots, f_n$ may be actively scanned over at uniform or approximately uniform durations within the total time period extending from $t_0$ to $t_f$. Thus, in one possible example, a computer processor of a mobile device may initiate an active scanning cycle by scanning frequency channel $f_1$ over a scan time of, for example, approximately 40.0 milliseconds. Following active scanning of frequency channel $f_1$, receiver circuitry of the mobile device may be tuned to receive signals from frequency channel $f_2$, over a second approximately 40.0 millisecond scan time. Accordingly, available frequency channels (e.g., $f_1, f_2, f_3, \ldots, f_n$) may be initially scanned over approximately uniform active scan times represented by $t_1, t_2, t_3, \ldots, t_n$.

Responsive to uniform or approximately uniform initial scanning of available frequency channels, a mobile device may map wireless transceivers, such as wireless access points, for example, into a frequency channel versus discovered transceiver table. Table 1 (below) provides an example frequency versus discovered transceiver table into which frequency channel scanning results may be compiled.

TABLE 1

Frequency Channels versus Discovered Transceivers

| Frequency Channel | Discovered Transceivers | MAC Addresses |
|---|---|---|
| $f_1$ | 3 | 00:A0 . . . |
|  |  | 01:A1 . . . |
|  |  | 30:B0 . . . |
| $f_2$ | 5 | 01:A0 . . . |
|  |  | 13:A1 . . . |
|  |  | 24:B0 . . . |
|  |  | 31:A1 . . . |
|  |  | 32:B0 . . . |
| $f_3$ | 0 | N/A |
| . . . | . . . | . . . |
| $f_N$ | 7 | 61:A0 . . . |
|  |  | 28:A1 . . . |
|  |  | 26:B0 . . . |
|  |  | 16:A1 . . . |
|  |  | 71:B0 . . . |
|  |  | 08:A1 . . . |
|  |  | 41:A1 . . . |

Thus, Table 1 indicates that responsive to actively scanning frequency channels $f_1$ to $f_N$ over uniform scan times of approximately 40.0 milliseconds, three wireless transceivers are discovered as using frequency channel 1, five transceivers are discovered using frequency channel 2, and zero wireless transceivers are discovered using frequency channel 3. Responsive to actively scanning frequency channel $f_N$, which may comprise a highest available frequency channel, for example, a mobile device may discover seven wireless transmitters operating. In one possible example, which may be encountered if a mobile device is operating using an IEEE Std. 802.11 protocol, a mobile device may actively scan a total of fourteen frequency channels (e.g., N=14).

In some embodiments, responsive to uniform or approximately uniform active scanning of available frequency channels, such as frequency channels $f_1, f_2, f_3, \ldots, f_n$, scan times may be re-allocated for one or more subsequent scans based, at least in part, on transceivers discovered on individual frequency channels during a current scheduled scan. Thus, available frequency channels may be initially scanned using uniform or approximately uniform active scan times over multiple scanning cycles, such as over five scanning cycles, ten scanning cycles, etc., to allow a mobile device to discover wireless transceivers transmitting signals on many frequency channels. Responsive to discovery of wireless transceivers responding on one or more frequency channels, a mobile device may increase active scan times for a subsequent scan of the one or more frequency channels. If, however, active scanning of a frequency channel does not bring about discovery of wireless transceivers, or brings about discovery of a small number of wireless transceivers, a mobile device may decrease active scan times for such frequency channels. Such re-allocation of scan times may permit a mobile device to assign receiver and processing resources, for example, in accordance with frequency channel activity.

It should be pointed out that in some embodiments, alternative values of uniform or approximately uniform initial active scan times may be employed, such as active scan times of less than approximately 40.0 milliseconds (e.g., approximately 20.0 milliseconds, approximately 30.0 milliseconds, etc.). Further, in other embodiments, active scan times greater than approximately 40.0 milliseconds (e.g., approximately 50.0 milliseconds, approximately 60.0 milliseconds, etc.) may be employed, and claimed subject matter is not limited in this respect. Further, although FIG. 3, for example, may show active scanning of lower frequency channels earlier in an active scanning cycle and active scanning of higher frequency channels later in the scanning cycle, embodiments may comprise active scanning of frequency channels in any order. Accordingly, in certain embodiments, active scanning of higher frequency channels may be scheduled to be performed earlier in an active scanning cycle, while scanning of lower frequency channels may be scheduled to be performed later in an active scanning cycle. In some embodiments, frequency channels may be actively scanned according to any frequency channel scanning schedule, such as pseudorandom, and claimed subject matter is intended to embrace all types of active scanning schedules without limitation.

Figure 4:
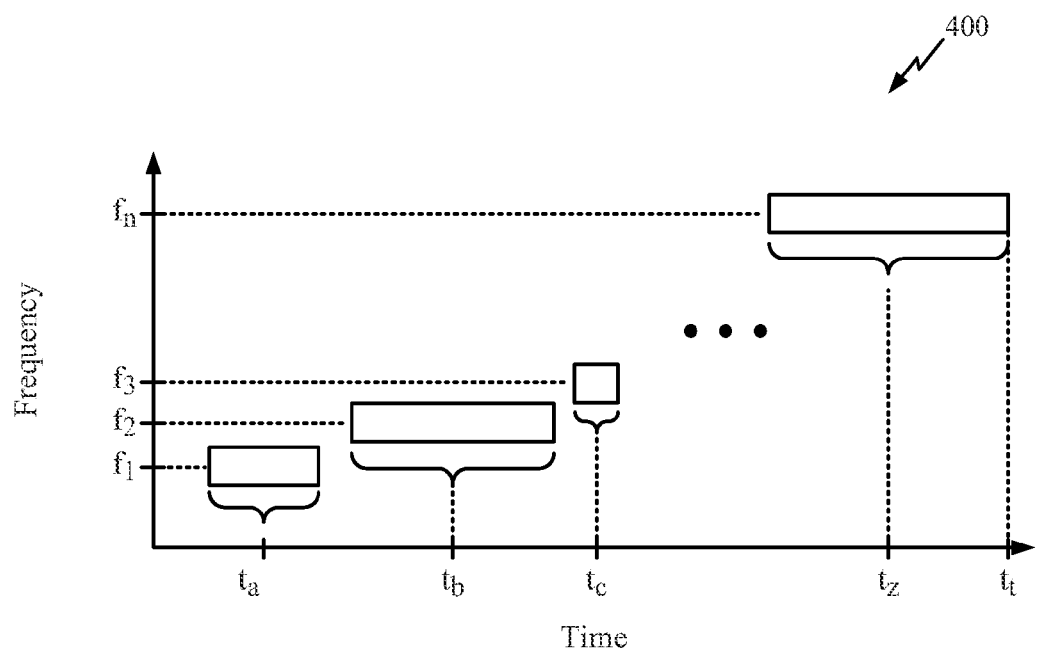
FIG. 4 is a graph showing re-allocated active scan times versus frequency bands used in a method for access point discovery according to an embodiment.

FIG. 4 is a graph 400 showing re-allocated scan times versus frequency bands used in a method for access point discovery according to an embodiment. In FIG. 4, active scanning similar to that described in relation to FIG. 3 may be employed. However, during the total time period extending from $t_0$ to $t_f$, active scanning times may be re-allocated among frequency channels $f_1, f_2, f_3, \ldots, f_n$, for example. Re-allocation may be based, at least in part, on a number of wireless transceivers mapped to frequency channels $f_1, f_2, f_3, \ldots, f_n$ shown in Table 1. In one possible example, re-allocation may bring about a frequency channel versus time scan schedule shown in Table 2 below:

TABLE 2

Frequency Channel versus Time Scan

| Frequency Channel | Number of Transceivers | Scan Time (approx.) |
|---|---|---|
| $f_1$ | 3 | 30.0 msec |
| $f_2$ | 5 | 70.0 msec |
| $f_3$ | 0 | 10.0 msec |
| ... | ... | |
| $f_N$ | 7 | 100.0 msec |

As shown in Table 2, frequency channel $f_1$ may be currently scheduled for active scanning over a decreased duration, such as approximately 30.0 milliseconds, which may correspond to an active scan time $t_a$ of FIG. 4. Likewise, frequency channel $f_3$ may also be actively scanned over a decreased duration, such as approximately 10.0 milliseconds, which may correspond to an active scan time $t_C$ of FIG. 4.

Table 2 and the example of FIG. 4 show increasing active scan times for subsequent scans of frequency channels identified as being relatively active, for example. Thus, frequency channel $f_2$ may be actively scanned over an increased duration, such as approximately 70.0 milliseconds, which may correspond to active scan time $t_b$ of FIG. 4. Likewise, frequency channel $f_n$ may also be actively scanned over an increased duration, such as approximately 60.0 milliseconds, which may correspond to active scan time $t_z$ of FIG. 4.

In some embodiments, a mobile device may incrementally increase and/or decrease active scan times for subsequent scans following a scanning cycle, for example. Thus, in one possible embodiment, a mobile device discovering multiple transceivers during a current scheduled scan may increase one or more active scan times from approximately 40.0 milliseconds to, for example, approximately 50.0 milliseconds for subsequent scans. Responsive to discovering additional transceivers on frequency channels, a mobile device may additionally increment an active scan time, such as from approximately 50.0 milliseconds to, for example, approximately 60.0 milliseconds. Similarly, a mobile device discovering relatively few transceivers responding on one or more frequency channels may decrease an active scan time from approximately 40.0 milliseconds to, for example, approximately 30.0 milliseconds. Responsive to continuing to discover relatively few transceivers responding on frequency channels, a mobile device may further decrease and active scan time, such as from approximately 30.0 milliseconds approximately 20.0 milliseconds.

In other embodiments, a mobile device may increase and/or decrease active scan times responsive to discovering wireless transceivers operating on frequency channels over a number of active scanning cycles, such as five scanning cycles, ten scanning cycles, fifteen scanning cycles, and so forth. Use of multiple scanning cycles may allow a mobile device to assess channel activity over, for example, approximately 5.0 seconds, approximately 10.0 seconds, approximately 30.0 seconds, and so forth. In some embodiments, such time filtering may decrease an impact of short term changes in channel activity bursts in a mobile device's determination of relatively active versus relatively inactive frequency channels.

Occasionally, a mobile device may return to scheduling uniform or approximately uniform active scan times of available frequency channels. In certain embodiments, such uniform active scanning may permit a mobile device to reassess usage of frequency channels, which may be of particular benefit if a mobile device is relocated among differing signal environments. For example, a mobile device user visiting various establishments of a shopping mall may exit a large department store comprising a first frequency channel usage environment. Following entry into a second establishment of the shopping mall, the mobile device may re-allocate active scanning among available frequency channels to bring about uninterrupted with communications with wireless transceivers, such as wireless access points.

In some embodiments, a mobile device may limit upper and lower values for active scan times of frequency channels. For example, in one possible embodiment, a mobile device may benefit from scheduling active scan times of a frequency channel to between a first period of scan time, such as approximately 10.0 milliseconds, and a second period of scan time, such as approximately 100.0 milliseconds. Such limiting of active scan times may permit a mobile device to monitor available channels to maintain periodic and/or occasional communications with, for example, all available frequency channels. In one example, if a mobile device performs a periodic, nominal (e.g., approximately 10.0 milliseconds) active scan of a relatively inactive frequency channel, the mobile device may be notified in a timely manner if the inactive frequency channel transitions to an active state. In another example, if a mobile device performs a longer-duration active scan (e.g., approximately 100.0 milliseconds) of a frequency channel, a mobile device may monitor frequency channel activity without unduly diverting receiver and/or processor resources.

Figure 5:
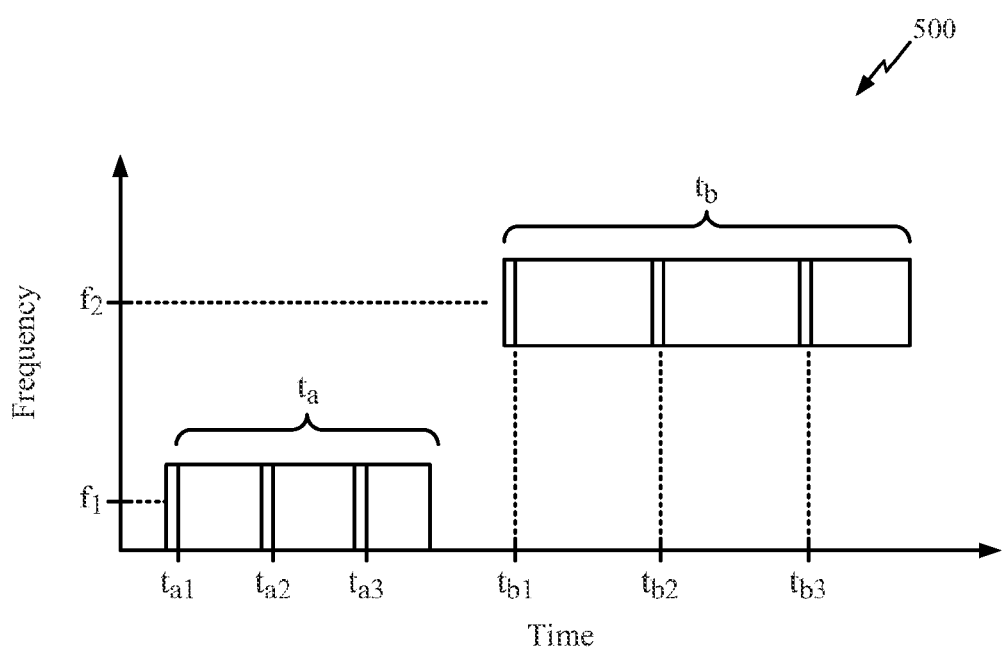
FIG. 5 is a graph showing probe messages transmitted during or prior to re-allocated active scan times in a method for access point discovery according to an embodiment.

FIG. 5 is a graph 500 showing probe messages transmitted during and/or prior to re-allocated scan times in a method for access point discovery according to an embodiment. Although the example of FIG. 5 shows only two frequency channels, embodiments may comprise a mobile device accessing several frequency channels, such as five frequency channels, ten frequency channels, and so forth. In FIG. 5, a mobile device may transmit a probe message using a frequency channel $f_1$ at a time $t_{a1}$. Following transmission of a probe signal using a frequency channel, a mobile device may actively scan the frequency channel to discover transceivers responding on frequency channel $f_1$, for example. In some embodiments, a mobile device may repeat transmission of probe messages during an active scan time. Thus, in the example of FIG. 5, the mobile device may transmit three probe messages during an active time scan $t_a$, for example, at times $t_{a1}$, $t_{a2}$, and $t_{a3}$. In one possible example just for purposes of illustration, a mobile device may transmit three probe messages during or prior to an approximately 50.0 millisecond active scan time. Accordingly, probe messages may be transmitted shortly after tuning to a frequency channel, and at approximately 20.0 millisecond increments thereafter, for example.

As illustrated in FIG. 5, a mobile device may change a frequency or number of probe messages transmitted based, at least in part, on duration of an active scan time. For example, during longer active scans, such as greater than approximately 60.0 milliseconds, a mobile device may decrease the frequency or number of probe messages transmitted during the active scan. Thus, in one possible example, for longer active scan times, such as approximately 60.0 milliseconds, a mobile device may reduce probe message transmission frequency from approximately every 10.0 milliseconds to approximately every 25.0 milliseconds. Thus, as illustrated in FIG. 5, a probe message may be transmitted shortly after tuning to a frequency channel (e.g., at time $t_{b1}$) and at approximately 25.0 millisecond increments thereafter (e.g., at times $t_{b2}$, $t_{b3}$). In some embodiments, reductions in frequency and/or number of probe messages transmitted during relatively long active scan intervals may permit a mobile device to conserve battery and/or processing resources while continuing to solicit responses from wireless transceivers active on frequency channels. Further, if an active scan duration is decreased, such as from approximately 40.0 milliseconds to approximately 20.0 milliseconds, the frequency or number of probe messages transmitted during the active scan may be increased, such as from occurring approximately every 25.0 milliseconds to, for example, approximately every 10.0 milliseconds. Such increase may enable transmission of an adequate number of probe messages during shortened active time scans, for example.

Figure 6:
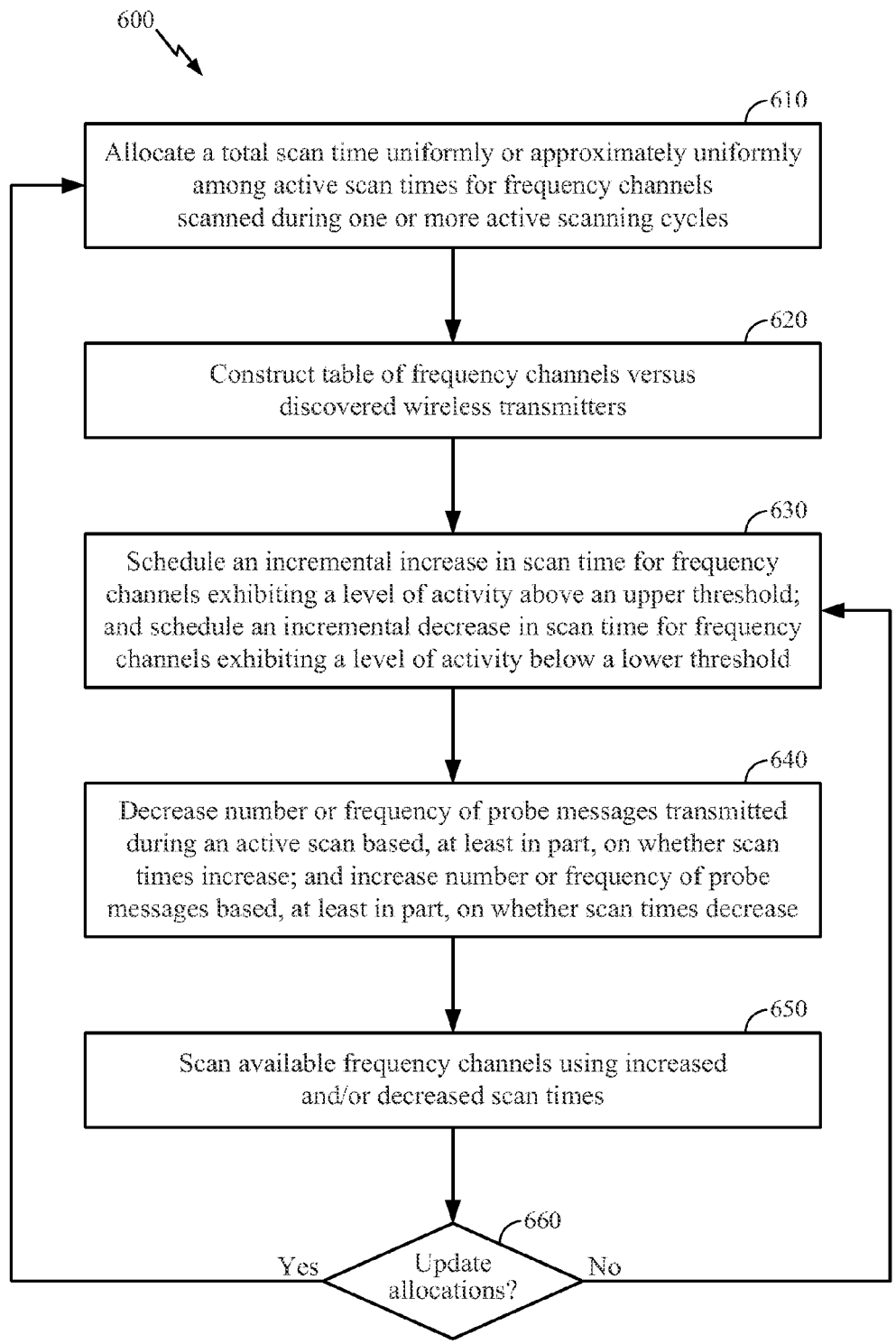
FIGS. 6-7 are flow diagrams for methods for access point discovery using re-allocated scan times according to embodiments.
Figure 7:
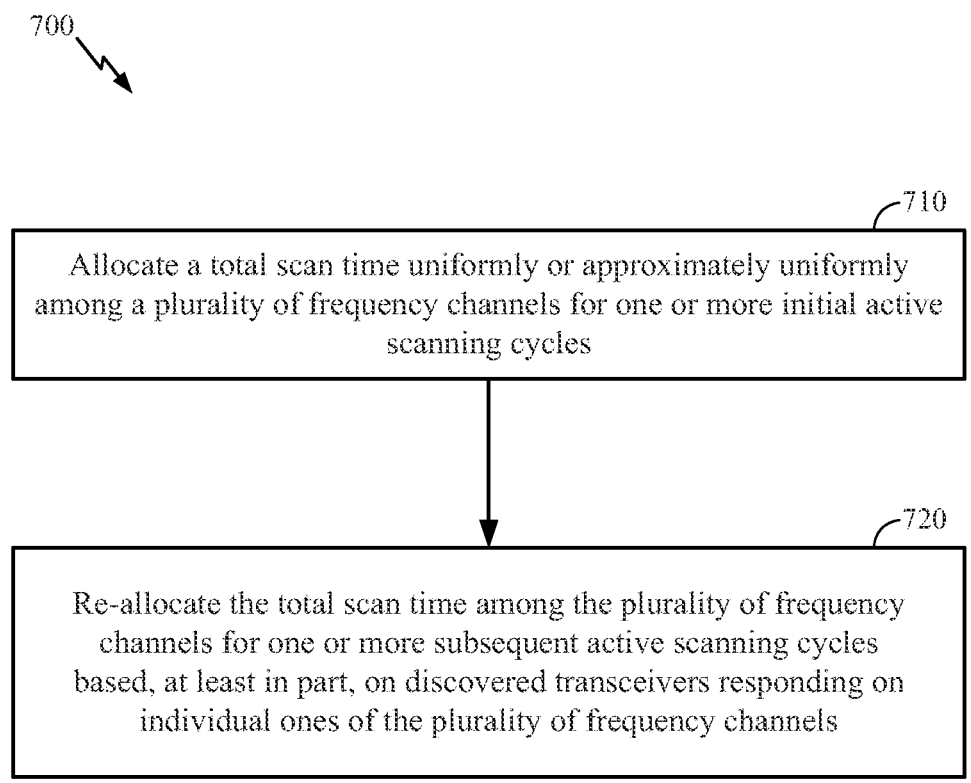

FIGS. 6-7 are flow diagrams for methods for access point discovery using re-allocated active scan times according to embodiments. The methods of FIG. 6-7 may be performed by, for example, mobile device 102 of FIGS. 1-2 in communicating with one or more wireless transceivers, such as access points 210, 220, 230, and/or 240 of FIG. 2. The methods of FIGS. 6-7 may also be performed by other types of wireless devices in communication with one or more transceivers, and claimed subject matter is not limited in this respect. Example implementations, such as described in FIGS. 6-7, may include actions or operations in addition to those illustrated in the blocks of diagrams 600 and 700. Example implementations may also include fewer actions or operations, actions or operations occurring in a different order, or any combination thereof.

Method 600 of FIG. 6 may begin at block 610 in which a mobile device, such as mobile device 102 of FIGS. 1 and 2, initially allocates a total active scan time uniformly or approximately uniformly among active scan times for frequency channels scanned during one or more active scanning cycles. In some embodiments, active scan times may be allocated in which available frequency channels may be actively scanned for approximately 40.0 milliseconds, for example. In particular embodiments, active scanning of available frequency channels may be performed in cycles in which a mobile device may begin by scanning lower frequency channels followed by scanning higher frequency channels, for example. Responsive to active scanning of higher frequency channels during a first cycle, for example, a mobile device may initiate a second active scanning cycle beginning with scanning of lower frequency channels. A mobile device may perform a plurality of active scanning cycles of available frequency channels, such as five scanning cycles, ten scanning cycles, fifteen scanning cycles, and claimed subject matter is not limited in this respect.

At 620, a mobile device may construct a table of frequency channels versus wireless transceivers discovered in response to one or more active scans of frequency channels, such as represented by Table 1 herein, for example. It should be noted, however, that frequency channels may be related with discovered wireless transceivers using arrangements other than that of Table 1, and claimed subject matter is not limited in this respect. Method 600 may continue at block 630, which may comprise incrementally increasing one or more currently scheduled active scan times for frequency channels having a level of activity above an upper threshold, for example. Block 630 may also comprise scheduling decreased active scan times for frequency channels having a level of activity below a lower threshold, for example. For example, if a mobile device discovers wireless transceivers operating on a particular frequency channel, the mobile device may schedule an incremental increase in a subsequent active scan time from, for example, approximately 40.0 milliseconds to approximately 50.0 milliseconds. Additionally, if a mobile device discovers relatively few or no wireless transceivers operating on a particular frequency channel, the mobile device may schedule an incremental decrease for a subsequent active scan time from, for example, approximately 40.0 milliseconds to approximately 30.0 milliseconds.

Particular embodiments may include block 640 in which a number of frequency of probe messages may be incrementally decreased based, at least in part on whether an active scan time increases. Thus, as described with reference to FIG. 5, for instances in which active scan times are increased, a mobile device may conserve battery and/or processing resources during extended active scan times by decreasing a number or a frequency of transmitted probe messages. In some embodiments, block 640 may also comprise, for example, increasing a number or frequency of probe messages based, at least in part, on whether an active scan time decreases. Such increases in frequency and/or number of probe message transmission may, for example, enable transmission of an adequate number of probe messages during shortened active time scans, for example. It should be noted, however, that increasing and/or decreasing frequency and/or number of probe messages transmitted during an active scan time may be bring about additional benefits, for example, and claimed subject matter is not limited in this respect.

At block 650, a mobile device may actively scan available frequency channels using re-allocated (e.g., increased and/or decreased) active scan times. In particular non-limiting examples, block 650 may represent several active scans, such as approximately five scans, ten scans, fifteen scans and so forth. In particular embodiments, a mobile device may limit increases in active scan times so that no scan time for a frequency channel exceeds, for example, approximately 100.0 milliseconds. Particular embodiments may additionally comprise a mobile device limiting decreases in active scan time so that no active scan time for a frequency channel falls below a first period of scan time such as approximately 10.0 milliseconds, for example. However, it should be noted that claimed subject matter is intended to embrace any and all such limiting of minimum and/or maximum active scan times without limitation. For example, in some embodiments, active scan times may be limited so that no scan time exceeds a second period of scan time, such as approximately 125.0 milliseconds, 150.0 milliseconds, and so forth. Further, in some embodiments, scan times may be limited so that no active scan time falls below approximately 20.0 milliseconds, approximately 5.0 milliseconds, or other appropriate active scan time.

In particular embodiments, it may be advantageous to update active scan re-allocations to account, for example, for changes in a mobile device's signal environment. In one possible example, if a mobile device user exits a large department store, within which a first group of frequency channels are in use, and enters a second department store, within which a second group of frequency channels are in use, the mobile device may re-allocate scanning among available frequency channels. Such re-scanning of available frequency channels may assist in bringing about uninterrupted communications with a communications network despite of the mobile device user's relocation.

Thus, at block 660, a mobile device may, perhaps responsive to instructions processed by a computer, determine that active scan times may be updated. If the decision of block 660 indicates that active scan times are scheduled for an update, a mobile device may return to block 610, which may comprise allocating a total scan time uniformly or approximately uniformly among active scan times for frequency channels scanned during one or more active scanning cycles. If the decision represented by block 660 indicates that active scan times are not scheduled for update, block 630 may again be performed. At block 630, a mobile device may schedule an incremental increase in active scan times for subsequent scans of frequency channels continuing to exhibit a level of activity approaching and/or in excess of a predetermined threshold, for example. Block 630 may also comprise scheduling an incremental decrease in active scan times for frequency channels continuing to exhibit a level of activity approaching and/or falling below a predetermined threshold, for example.

FIG. 7 is a flow diagram 700 for a method for access point discovery using re-allocated scan times according to embodiments. The method of FIG. 7 may be performed by a mobile device, for example, capable of scanning available frequency channels. The method of FIG. 7 may begin at block 710, which may comprise allocating a total active scan time uniformly or approximately uniformly among a plurality of frequency channels for one or more initial active scanning cycles. In an embodiment, a mobile device capable of communicating with wireless access points according to an IEEE Std. 802.11 protocol may scan up to fourteen frequency channels. Responsive to scanning frequency channels for one or more initial active scanning cycles, the method may continue at 720, which may comprise re-allocating the total scan time among the plurality of frequency channels for one or more subsequent active scanning cycles. Re-allocation may be based, at least in part, on discovered transceivers responding on individual ones of the plurality of frequency channels.

Figure 8:
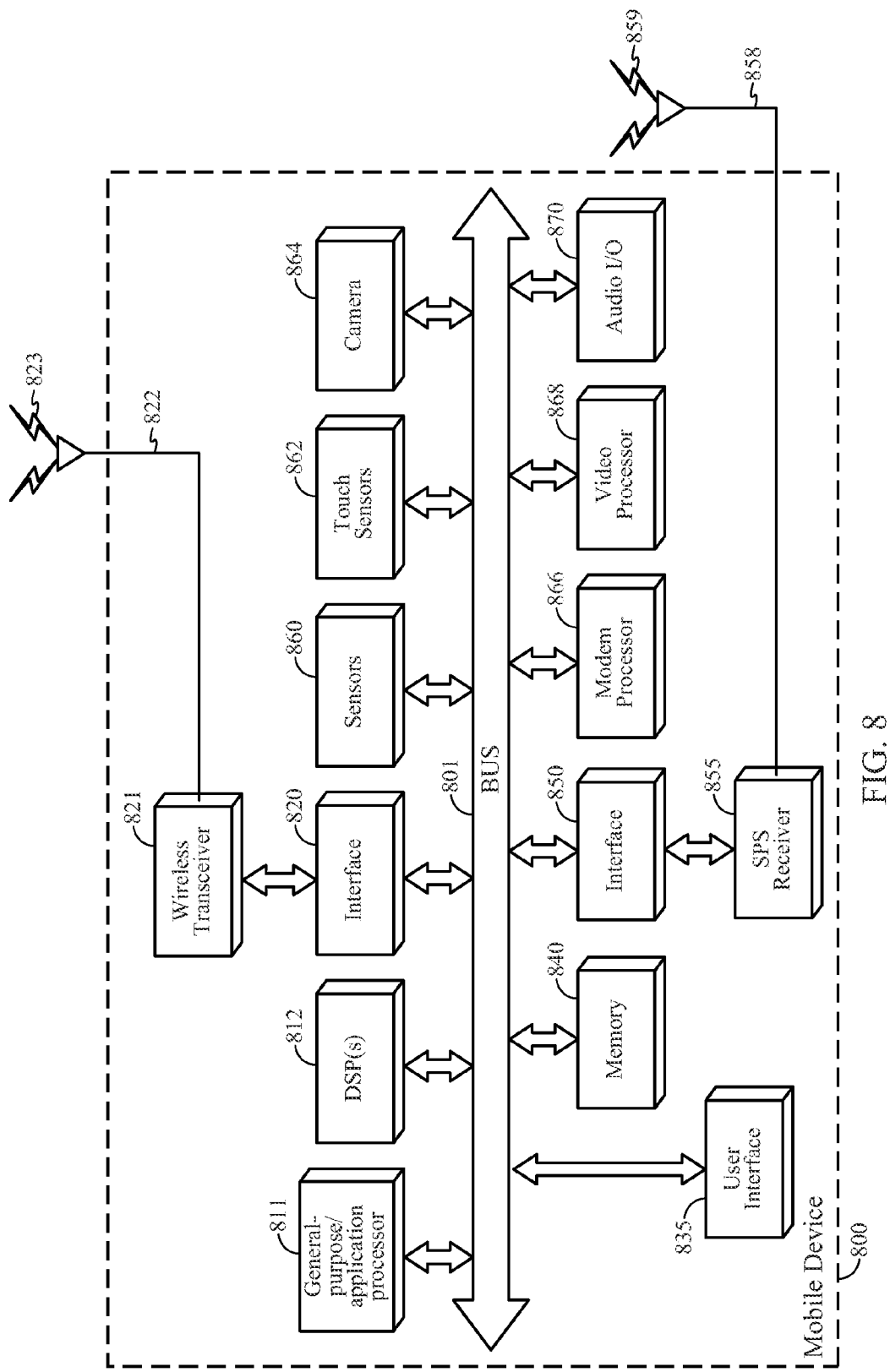
FIG. 8 is a schematic block diagram illustrating an exemplary device, in accordance with an embodiment.

FIG. 8 is a schematic diagram 800 of a mobile device according to an embodiment. Mobile device 102 (FIGS. 1-2) may comprise one or more features of mobile device 800 illustrated in FIG. 8. In certain embodiments, mobile device 800 may also comprise wireless transceiver 821, which is capable of transmitting and receiving wireless signals 823 via antenna 822 over a wireless communication network. Wireless transceiver 821 may be coupled to bus 801 by way of a wireless transceiver bus interface 820. Wireless transceiver bus interface 820 may, in some embodiments be at least partially integrated with wireless transceiver 821. Some embodiments may include, for example, multiple wireless transceivers 821 and wireless antennas 822 to enable transmitting and/or receiving signals according to corresponding multiple wireless communication standards for Wide Area Networks (WAN), Wireless Local Area Networks (WLAN), Personal Area Networks (PAN), etc. Such as, for example, versions of IEEE Std. 802.11, CDMA, WCDMA, LTE, UMTS, GSM, AMPS, Zigbee, and Bluetooth, just to name a few examples.

Mobile device 800 may also comprise SPS receiver 855 capable of receiving and acquiring SPS signals 859 via SPS antenna 858. SPS receiver 855 may also process, in whole or in part, acquired SPS signals 859 for estimating a location of mobile device 1000. In some embodiments, general-purpose processor(s) 811, memory 840, DSP(s) 812 and/or specialized processors (not shown) may also be utilized to process acquired SPS signals, in whole or in part, and/or calculate an estimated location of mobile device 800, in conjunction with SPS receiver 855. Storage of SPS or other signals for use in performing positioning operations may be performed in memory 840 or registers (not shown).

Also illustrated in FIG. 8, mobile device 800 may comprise digital signal processor(s) (DSP(s)) 812 connected to the bus 801 by a bus interface 810, general-purpose processor(s) 811 connected to the bus 801 by a bus interface 810 and memory 840. Bus interface 810 may be integrated with the DSP(s) 812, general-purpose processor(s) 811 and memory 840. In various embodiments, functions may be performed in response execution of one or more machine-readable instructions stored in memory 840 such as on a computer-readable storage medium, such as RAM, ROM, FLASH, or disc drive, just to name a few example. The one or more instructions may be executable by general-purpose processor(s) 811, specialized processors, or DSP(s) 812. Memory 840 may comprise a non-transitory processor-readable memory and/or a computer-readable memory that stores software code (programming code, instructions, etc.) that are executable by processor(s) 811 and/or DSP(s) 812 to perform functions described herein. Memory 840 may comprise a database for storing identifiers of wireless transceivers, such as wireless access points, which may be active on one or more available frequency channels.

Also illustrated in FIG. 8, a user interface 835 may comprise any one of several devices such as, for example, a speaker, microphone, display device, vibration device, keyboard, touch screen, just to name a few examples. In a particular implementation, user interface 835 may enable a user to interact with one or more applications hosted on mobile device 800. For example, devices of user interface 835 may store analog or digital signals on memory 840 to be further processed by DSP(s) 812 or general-purpose processor 811 in response to action from a user. Similarly, applications hosted on mobile device 800 may store analog or digital signals on memory 840 to present an output signal to a user. In implementations, a user may interact with user interface 835 to receive electronic digital maps, send and receive e-mails, perform text-messaging functions, and so forth.

In an implementation, mobile device 800 may include a dedicated audio input/output (I/O) device 870 comprising, for example, a dedicated speaker, microphone, digital to analog circuitry, analog to digital circuitry, amplifiers, and/or gain control. It should be understood, however, that this is merely an example of how an audio I/O may be implemented in a mobile device, and that claimed subject matter is not limited in this respect. In another implementation, mobile device 800 may comprise touch sensors 862 responsive to touching or pressure on a keyboard or touch screen device.

Mobile device 800 may also comprise a dedicated camera device 864 for capturing still or moving imagery. Camera device 864 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 811 or DSP(s) 812. Alternatively, a dedicated video processor 868 may perform conditioning, encoding, compression, or manipulation of signals representing captured images. Additionally, video processor 868 may decode/decompress stored image data for presentation on a display device (not shown) on mobile device 800.

Mobile device 800 may also comprise sensors 860 coupled to bus 801, which may include, for example, inertial sensors and environment sensors. Inertial sensors of sensors 860 may comprise, for example accelerometers (e.g., collectively responding to acceleration of mobile device 800 in three dimensions), one or more gyroscopes or one or more magnetometers (e.g., to support one or more compass applications). Environment sensors of mobile device 800 may comprise, for example, temperature sensors, barometric pressure sensors, ambient light sensors, camera imagers, microphones, just to name few examples. Sensors 860 may generate analog or digital signals that may be stored in memory 840 and processed by general purpose application processor 811 in support of one or more applications such as, for example, applications directed to positioning or navigation operations, download of electronic digital maps, text messaging, and so forth.

In a particular implementation, mobile device 800 may comprise a dedicated modem processor 866 capable of performing baseband processing of signals received and down-converted at wireless transceiver 821 or SPS receiver 855. Similarly, modem processor 866 may perform baseband processing of signals to be upconverted for transmission by wireless transceiver 821. In alternative implementations, instead of comprising a dedicated modem processor, baseband processing may be performed by a general-purpose processor or DSP (e.g., general purpose/application processor 811 or DSP(s) 812). It should be understood, however, that these are merely examples of structures that may perform baseband processing, and that claimed subject matter is not limited in this respect.

In a particular implementation, mobile device 1000 may be capable of performing one or more of the actions set forth in the process of FIG. 8. For example, general-purpose application processor 811 may perform all or a portion of actions at blocks 610, 620, 630, 640, 660, 710, and/or 720.

Figure 9:
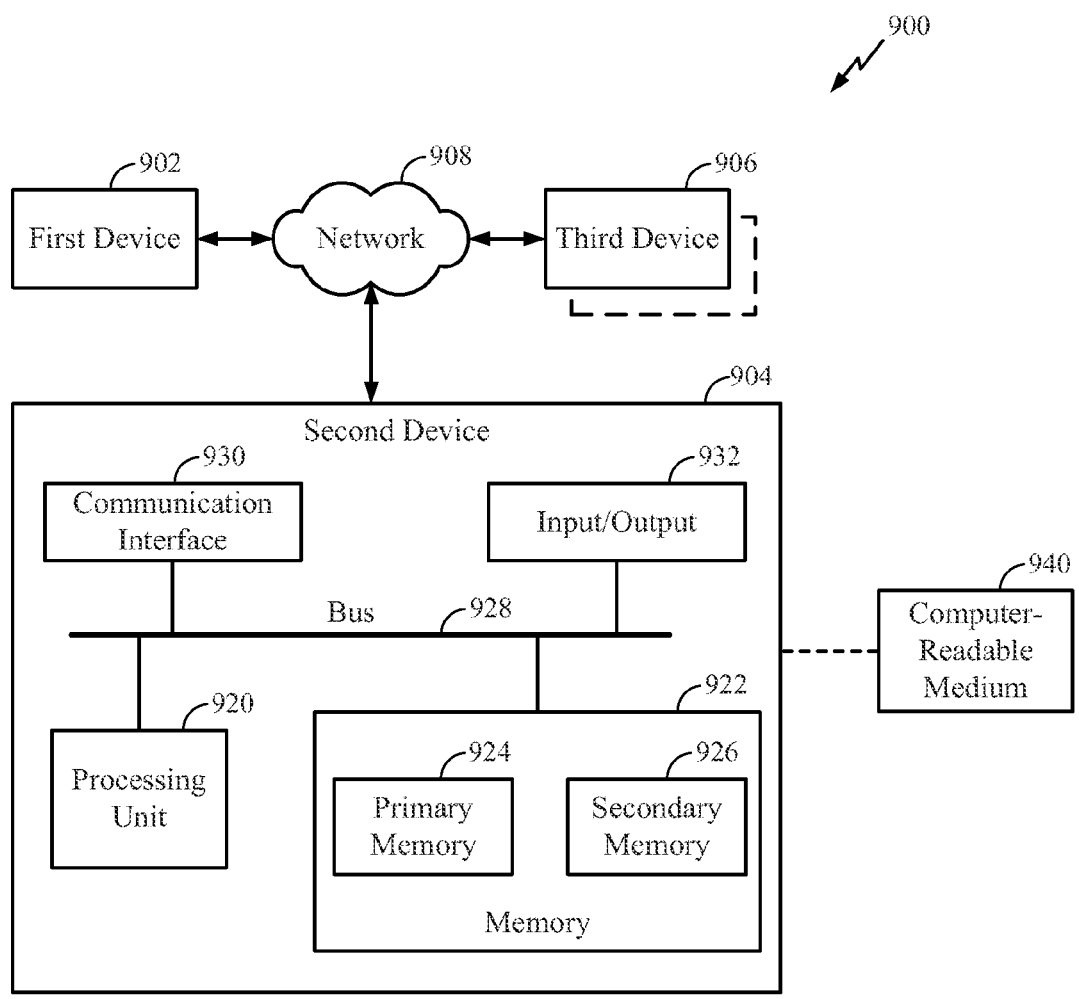
FIG. 9 is a schematic block diagram of an example computing platform in accordance with an embodiment.

FIG. 9 is a schematic block diagram illustrating a system 900 for wireless transceiver discovery using re-allocated scan times in accordance with an embodiment. System 900 of FIG. 9 may include one or more devices, such as first device 902, second device 904, and third device 906, which may be configurable to implement techniques or processes described above, for example, in connection with FIGS. 6 and 7 herein. For example, methods of FIGS. 6-7 may be implemented by a processor of mobile device, which may be represented by second device 904, for actively scanning frequency channels and re-allocating active scan times. First device 902, second device 904, and third device 906, may be operatively coupled through a wireless communications network 908. In particular embodiments, first device 902 may comprise a server capable of responding to probe messages, such as request-to-send messages, with clear-to-send messages, for example. Second and third devices 904 and 906 may comprise mobile devices capable of re-allocating scan times based, at least in part, on discovery of wireless transceivers operating on one or more frequency channels, in an aspect. In addition, in an aspect, wireless communications network 908 may comprise one or more cellular base stations and/or wireless access points, for example. However, claimed subject matter is not limited in scope in these respects.

In particular embodiments, first device 902, second device 904 and third device 906, as illustrated in FIG. 9, may be representative of any device, appliance or machine (e.g., such as wireless transmitter 115 or servers 140, 150 or 155 as illustrated in FIG. 1) that may be configurable to exchange data over wireless communications network 908. By way of example but not limitation, any of first device 902, second device 904, or third device 906 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 902, 904, and 906, respectively, may comprise one or more of a base station almanac server, a base station, or a mobile device in accordance with the examples described herein.

Similarly, communications network 908 (e.g., in a particular of implementation of network 130 illustrated in FIG. 1), may be representative of one or more communication links, processes, or resources configurable to support the exchange of data between at least two of first device 902, second device 904, and third device 906. By way of example but not limitation, communications network 908 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 906, there may be additional like devices operatively coupled to wireless communications network 908. Thus, by way of example but not limitation, second device 904 may include at least one processing unit 920 that is operatively coupled to a memory 922 through a bus 928. It is recognized that all or part of the various devices and networks illustrated in system 900, and the processes and methods as further described herein, may be implemented using or otherwise including hardware, firmware, software, or any combination thereof.

Processing unit 920 is representative of one or more circuits configurable to perform at least a portion of a data computing procedure or process. By way of example but not limitation, processing unit 920 may include one or more processors, controllers, microprocessors, microcontrollers, application specific integrated circuits, digital signal processors, programmable logic devices, field programmable gate arrays, and the like, or any combination thereof.

Memory 922 is representative of any data storage mechanism. Memory 922 may include, for example, a primary memory 924 or a secondary memory 926. Primary memory 924 may include, for example, a random access memory, read only memory, etc. While illustrated in this example as being separate from processing unit 920, it should be understood that all or part of primary memory 924 may be provided within or otherwise co-located/coupled with processing unit 920.

In particular implementation, second device 904 may be capable of rendering an estimated location of a mobile device. For example, second device 904 may receive parameters in messages receiving from a client STA, receiving STA and/or sending STA through communication network 908 for use in forming expressions for use in computing an estimated location of the client STA. In certain implementations, a transceiver (not shown) of a second device 904 may transmit an estimated location of second device 904 to first device 902. Responsive to discovering wireless transceivers operating on frequency channels within wireless communications range of second device 904, second device 904 may re-allocate a total scan time based, at least in part, on a number of wireless transmitters discovered operating on available frequency channels. Second device 904 may display one or more estimated positions on an electronic digital map downloaded from a first device 902 by way of a display device (not shown) coupled to, for example bus 928. Secondary memory 926 may include, for example, the same or similar type of memory as primary memory or one or more data storage devices or systems, such as, for example, a disk drive, an optical disc drive, a tape drive, a solid state memory drive, etc. In certain implementations, secondary memory 926 may be operatively receptive of, or otherwise configurable to couple to, a computer-readable medium 940. Computer-readable medium 940 may include, for example, any non-transitory medium that can carry or make accessible data, code or instructions for one or more of the devices in system 900. Computer-readable medium 940 may also be referred to as a storage medium.

Second device 904 may include, for example, a communication interface 930 that provides for or otherwise supports the operative coupling of second device 904 to at least wireless communications network 908. By way of example but not limitation, communication interface 930 may include a network interface device or card, a modem, a router, a switch, a transceiver, and the like.

Second device 904 may include, for example, an input/output device 932. Input/output device 932 is representative of one or more devices or features that may be configurable to accept or otherwise introduce human or machine inputs, or one or more devices or features that may be configurable to deliver or otherwise provide for human or machine outputs. By way of example but not limitation, input/output device 932 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Memory 922 may represent any suitable or desired information storage medium. For example, memory 922 may include a primary memory 924 and a secondary memory 926. Primary memory 924 may include, for example, a random access memory, read only memory, etc. While illustrated in this example as being separate from a processing unit, it should be appreciated that all or part of primary memory 924 may be provided within or otherwise co-located/coupled with processing unit 920. Secondary memory 926 may include, for example, the same or similar type of memory as primary memory or one or more information storage devices or systems, such as, for example, a disk drive, an optical disc drive, a tape drive, a solid state memory drive, etc. In certain implementations, secondary memory 926 may be operatively receptive of, or otherwise enabled to be coupled to, a non-transitory computer-readable medium 940.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered a self-consistent sequence of operations or similar signal processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("WWAN"), a wireless local area network ("WLAN"), a wireless personal area network (WPAN), and so on. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE Std. 802.11x network, and a WPAN may comprise a Bluetooth network, an IEEE Std. 802.15x, for example. Wireless communication implementations described herein may also be used in connection with any combination of WWAN, WLAN or WPAN.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method comprising, at a mobile device:
    allocating a total scan time uniformly among a plurality of frequency channels for one or more initial active scanning cycles; and
    re-allocating said total scan time among said plurality of frequency channels for one or more subsequent active scanning cycles based, at least in part, on discovered transceivers responding on individual ones of said plurality of frequency channels, wherein said total scan time is re-allocated such that no channel of said plurality of frequency channels is allocated less than a first period of scan time and no channel of said plurality of frequency channels is allocated more than a second period of scan time.

2. The method of claim 1, wherein said re-allocating said total scan time among said plurality of frequency channels for said one or more subsequent active scanning cycles further comprises:
    increasing scan time for at least one of said plurality of frequency channels in response to detecting a level of channel activity that approaches or exceeds an upper threshold based, at least in part, on a number of transceivers discovered transmitting on said at least one of said plurality of frequency channels.

3. The method of claim 2, wherein said increasing scan time for said at least one of said plurality of frequency channels further comprises:
    scheduling an incremental increase in scan time for said at least one of said plurality of frequency channels based, at least in part, on a current scheduled scan time for said at least one of said plurality of frequency channels and based, at least in part, on said level of channel activity continuing at a level above said upper threshold.

4. The method of claim 1, wherein said re-allocating said total scan time among said plurality of frequency channels for said one or more subsequent active scanning cycles further comprises:
    decreasing scan time for at least one of said plurality of frequency channels in response to detecting a level of channel activity that approaches or falls below a lower threshold based, at least in part, on a number of transceivers discovered transmitting on said at least one of said plurality of frequency channels.

5. The method of claim 4, wherein said decreasing scan time for said at least one of said plurality of frequency channels further comprises:
    scheduling an incremental decrease in scan time for said at least one of said plurality of frequency channels based, at least in part, on a current scheduled scan time for said at least one of said plurality of frequency channels and based, at least in part, on said level of channel activity continuing at a level below said lower threshold.

6. The method of claim 1, and further comprising:
    changing a frequency or number of probe messages transmitted during a scan time for at least one of said plurality of frequency channels based, at least in part, on transceivers discovered transmitting on said at least one of said plurality of frequency channels.

7. The method of claim 6, wherein said changing said frequency or said number of probe messages transmitted during said scan time further comprises:
    increasing said frequency or said number of probe messages based, at least in part, on a decrease in said scan time; and
    decreasing said frequency or said number of probe messages based, at least in part, on an increase in said scan time.

8. A mobile device comprising:
    a transmitter to transmit one or more probe messages to a communications channel;
    a receiver to receive responses responsive to said one or more transmitted probe messages; and
    one or more processors coupled to said transmitter and to said receiver configured to:
        allocate a total scan time uniformly among a plurality of frequency channels to transmit said one or more transmitted probe messages and to receive responses from transceivers responding to said one or more transmitted probe messages; and
        re-allocate said total scan time among said plurality of frequency channels for one or more scheduled active scanning cycles based, at least in part, on said transceivers responding to said one or more transmitted probe messages, said total scan time to be re-allocated such that no channel of said plurality of frequency channels is to be allocated less than a first period of scan time and no channel of said plurality of frequency channels is to be allocated more than a second period of scan time.

9. The mobile device of claim 8, wherein said one or more processors are additionally configured to:
    increase scan time for at least one of said plurality of frequency channels in response to detecting a level of channel activity that approaches or exceeds an upper threshold based, at least in part, on a number of transceivers discovered on said at least one of said plurality of frequency channels.

10. The mobile device of claim 9, wherein said one or more processors are additionally configured to:
    schedule an incremental increase in scan time for said at least one of said plurality of frequency channels based, at least in part, on a current scheduled scan time for said at least one of said plurality of frequency channels and based, at least in part, on said level of channel activity continuing at a level above said upper threshold.

11. The mobile device of claim 8, wherein said one or more processors are additionally configured to:
    decrease scan time for at least one of said plurality of frequency channels in response to a level of channel activity that approaches or falls below a lower threshold based, at least in part, on a number of transceivers discovered transmitting on said at least one of said plurality of frequency channels.

12. The mobile device of claim 11, wherein said one or more processors are additionally configured to:
schedule an incremental decrease in scan time for said at least one of said plurality of frequency channels based, at least in part, on a current scan time for said at least one of said plurality of frequency channels and based, at least in part, on said level of channel activity continuing at a level below said lower threshold.

13. The mobile device of claim 8, wherein said one or more processors are additionally configured to:
change a frequency or number of probe messages transmitted during a scan time for at least one of said plurality of frequency channels based, at least in part, on transceivers discovered transmitting on said at least one of said plurality of frequency channels.

14. The mobile device of claim 13, wherein said one or more processors are additionally configured to:
increase said frequency or said number of probe messages based, at least in part, on a decrease in said scan time; and
decrease said frequency or said number of probe messages based, at least in part, on an increase in said scan time.

15. An article comprising:
a non-transitory storage medium comprising machine-readable instructions stored thereon which are executable by one or more processors of a mobile device to:
allocate a total scan time uniformly among a plurality of frequency channels for one or more initial active scanning cycles;
re-allocate said total scan time among said plurality of frequency channels for one or more subsequent active scanning cycles based, at least in part, on discovered transceivers responding on individual ones of said plurality of frequency channels; and
increase scan time for at least one of said plurality of frequency channels in response to detecting a level of channel activity that approaches or exceeds an upper threshold based, at least in part, on a number of transceivers discovered transmitting on said at least one of said plurality of frequency channels.

16. The article of claim 15, wherein said non-transitory storage medium comprising machine-readable instructions stored thereon which are further executable by said one or more processors of said mobile device to:
schedule an incremental increase in scan time for said at least one of said plurality of frequency channels based, at least in part, on a current scheduled scan time for said at least one of said plurality of frequency channels and based, at least in part, on said level of channel activity continuing at a level above said upper threshold.

17. The article of claim 15, wherein said non-transitory storage medium comprising machine-readable instructions stored thereon which are further executable by said one or more processors of said mobile device to:
decrease scan time for at least one of said plurality of frequency channels in response to detecting a level of channel activity that approaches or falls below a lower threshold based, at least in part, on a number of transceivers discovered transmitting on said at least one of said plurality of frequency channels.

18. The article of claim 17, wherein said non-transitory storage medium comprising machine-readable instructions stored thereon which are further executable by said one or more processors of said mobile device to:
schedule an incremental decrease in scan time for said at least one of said plurality of frequency channels based, at least in part, on current a scan time for said at least one of said plurality of frequency channels and based, at least in part, on said level of channel activity continuing at a level below said lower threshold.

19. The article of claim 15, wherein said non-transitory storage medium comprising machine-readable instructions stored thereon which are further executable by said one or more processors of said mobile device to:
change a frequency or number of probe messages transmitted during a scan time for at least one of said plurality of frequency channels based, at least in part, on transceivers discovered transmitting on said at least one of said plurality of frequency channels.

20. The article of claim 15, wherein said non-transitory storage medium comprising machine-readable instructions stored thereon which are executable by said one or more processors of said mobile device are additionally to:
re-allocate said total scan time such that no channel of said plurality of frequency channels is allocated less than a first period of scan time and no channel of said plurality of frequency channels is allocated more than a second period of scan time.

21. A mobile device, comprising:
means for allocating a total scan time uniformly among a plurality of frequency channels for one or more initial active scanning cycles;
means for re-allocating said total scan time among said plurality of frequency channels for one or more subsequent active scanning cycles based, at least in part, on discovered transceivers responding on individual ones of said plurality of frequency channels; and
means for increasing scan time for at least one of said plurality of frequency channels in response to detecting a level of channel activity that approaches or exceeds an upper threshold based, at least in part, on a number of transceivers discovered transmitting on said at least one of said plurality of frequency channels.

22. The mobile device of claim 21, further comprising:
means for scheduling an incremental increase in scan time for said at least one of said plurality of frequency channels based, at least in part, on a current scheduled scan time for said at least one of said plurality of frequency channels and based, at least in part, on said level of channel activity continuing at level above said upper threshold.

23. The mobile device of claim 21, further comprising:
means for decreasing scan time for at least one of said plurality of frequency channels in response to a level of channel activity that approaches or falls below a lower threshold based, at least in part, on a number of transceivers discovered transmitting on said at least one of said plurality of frequency channels.

24. The mobile device of claim 23, further comprising:
means for scheduling an incremental decrease in scan time for said at least one of said plurality of frequency channels based, at least in part, on a current scan time for said at least one of said plurality of frequency channels and based, at least in part, on said level of channel activity continuing to fall below said lower threshold.

25. The mobile device of claim 21, further comprising:
means for changing a frequency or number of probe messages transmitted during a scan time for at least one of said plurality of frequency channels based, at least in part, on transceivers discovered transmitting on said at least one of said plurality of frequency channels.

26. The mobile device of claim 25, wherein said means for changing said frequency or said number of probe messages transmitted during a scan time further comprises;

means for increasing said frequency or said number of probe messages based, at least in part, on a decrease in said scan time; and means for decreasing said frequency or said number of probe messages based, at least in part, on an increase in said scan time.

* * * * *